3,016,390
N-(SUBSTITUTED ALKYL)AMINO-5α-ANDROSTAN-17β-OLS
Raymond E. Counsell, Skokie, Ill., assignor to G. D. Searle & Co., Chicago, Ill., a corporation of Delaware
No Drawing. Filed June 30, 1960, Ser. No. 47,339
6 Claims. (Cl. 260—397.5)

The present invention is concerned with derivatives of 3-amino-steroids of the androstane series and, more particularly, with N-(substituted alkyl)amino-5α-androstan-17β-ols as represented by the structural formula

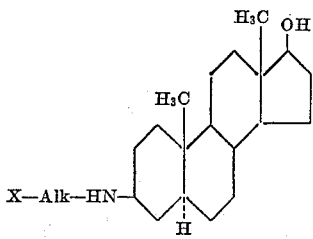

wherein Alk is a lower alkylene radical and X is a member of the class consisting of hydroxy, phenyl, and di-(lower alkyl)amino radicals.

Lower alkylene radicals encompassed by Alk are, typically, methylene, ethylene, trimethylene, tetramethylene, pentamethylene, and the branched-chain isomers thereof. The lower alkyl radicals comprehended in the R term are exemplified by methyl, ethyl, propyl, butyl, pentyl, hexyl, and their branched-chain isomers.

A substance suitable for use as starting material in the manufacture of the instant compounds is 17β-hydroxy-5α-androstan-3-one. Reductive amination of the 3-oxo group of that ketone by treatment with the appropriate amine in a hydrogen atmosphere in the presence of a suitable hydrogenation catalyst affords the secondary amines of this invention. A specific illustration of this process is the reaction of the aforementioned 17β-hydroxy-5α-androstan-3-one in ethanol with ethanolamine and hydrogen in the presence of 5% palladium-on-carbon catalyst to afford 3β-(2-hydroxyethyl)amino-5α-androstan-17β-ol. The hydrogen pressure is suitably in the range of 1–5 atmospheres, and the reaction is conveniently conducted at room temperature. At the conclusion of the reaction period, the catalyst is separated by filtration to afford a solution containing the desired product.

The compounds of this invention exhibit valuable pharmacological properties. They are, for example hormonal and anti-hormonal agents as evidenced by their ability to induce a response characteristic of androgens, to inhibit the sodium-retaining activity of desoxycorticosterone acetate, and to counteract the susceptibility to Coxsackie virus infection which accompanies the administration of cortisone. In addition, they are cardiac eurhythmic agents in consequence of their ability to inhibit atrial arhythmias.

Specific illustrations of the present invention are represented by the following examples, which are not to be construed as limiting this invention either in spirit or in scope. Temperatures are given in degrees centigrade (° C.), and quantities of materials in parts by weight unless otherwise noted.

Example 1

To a solution of 2.9 parts of 17β-hydroxy-5α-androstan-3-one and 1.2 parts of ethanolamine in 80 parts of ethanol is added 0.5 part of 5% palladium-on-carbon catalyst, and the resulting mixture is shaken in a hydrogen atmosphere at 1–3 atmospheres pressure until the absorption of gas ceases. The catalyst is removed by filtration, washed with ethanol, and the filtrate is concentrated to dryness at reduced pressure. Recrystallization of the residue from aqueous ethanol results in pure 3β-(2-hydroxyethyl)amino-5α-androstan-17β-ol, M.P. 202–203.5°; $[\alpha]_D = +9.5°$ (chloroform). Infrared maxima are observed at about 2.98, 3.06, 3.4, 6.88, 9.34, and 11.72 microns.

By substituting an equivalent quantity of isopropanolamine in the process of this example, 3β-(2-hydroxypropyl)amino-5α-androstan-17β-ol is obtained.

Example 2

A solution containing 2.9 parts of 17β-hydroxy-5α-androstan-3-one and 2.4 parts of phenethylamine in 80 parts of ethanol is mixed with 0.5 part of 5% palladium-on-carbon catalyst, then shaken in a hydrogen atmosphere at 1–3 atmospheres pressure until one molecular equivalent of hydrogen is absorbed. The catalyst is removed by filtration, washed with ethanol, and the filtrate is evaporated to dryness in vacuo. The resulting residue is crystallized from ethanol to yield pure 3β-phenethylamino-5α-androstan-17β-ol, M.P. 170.5–171.5°; $[\alpha]_D = +4°$ (chloroform). This substance is characterized by infrared maxima at about 2.72, 3.4, 6.22, 6.85, and 8.94 microns.

The substitution of an equivalent quantity of 3-phenylpropylamine in the process of this example results in 3β-(3-phenylpropyl)amino-5α-androstan-17β-ol.

Example 3

To a solution of 5.8 parts of 17β-hydroxy-5α-androstan-3-one and 4.24 parts of 3-diethylaminopropylamine in 160 parts of ethanol is added 0.6 part of 10% palladium-on-carbon catalyst, and this mixture is shaken with hydrogen at 1–3 atmospheres pressure until no further pressure drop is observed. Filtration of the reaction mixture effects removal of the catalyst, which is washed with ethanol. The resulting filtrate is stripped of solvent at reduced pressure, and the residue is crystallized from acetone to yield pure 3β-(3-diethylaminopropyl)amino-5α-androstan-17β-ol, M.P. 97.5–98.5°; $[\alpha]_D = +8.1°$ (chloroform). This substance exhibits maxima in its infrarerd absorption spectrum at about 2.74, 3.4, 6.88, and 7.23 microns.

By substituting an equivalent quantity of 3-dimethylaminopropylamine and otherwise proceeding according to the herein-described processes, 3β-(3-dimethylaminopropyl)amino-5α-androstan-17β-ol is obtained.

Example 4

To a solution comprising 5.8 parts of 17β-hydroxy-5α-androstan-3-one and 4.6 parts of 2-diethylaminoethylamine in 160 parts of ethanol is added one part of 5% palladium-on-carbon catalyst, and the resulting mixture is shaken in a hydrogen atmosphere at 1–3 atmospheres pressure until the absorption of gas ceases. Removal of the catalyst by filtration followed by washing of the filter cake with ethanol affords the filtrate, which is then stripped of solvent at reduced pressure. The resulting residue is crystallized from acetone to produce 3β-(2-diethylaminoethyl)amino-5α-androstan-17β-ol, M.P. 127–128.5°; $[\alpha]_D = +12°$ (chloroform). It displays maxima in the infrared at about 2.73, 3.4, 6.88, and 7.22 microns.

What is claimed is:
1. A compound of the structural formula

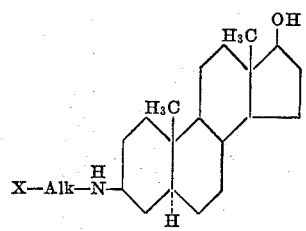

wherein X is selected from the group consisting of hydroxy, phenyl, and di-(lower alkyl)amino radicals, and Alk is a lower alkylene radical.

2. A compound of the structural formula

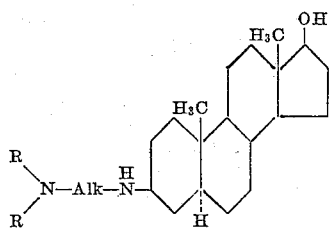

wherein Alk is a lower alkylene radical, and R is a lower alkyl radical.

3. 3β-(2-hydroxyethyl)amino-5α-androstan-17β-ol.
4. 3β-phenethylamino-5α-androstan-17β-ol.
5. 3β - [(3 - diethylamino)propyl]amino - 5α - androstan-17β-ol.
6. 3β - [(2 - diethylamino)ethyl]amino - 5α - androstan-17β-ol.

References Cited in the file of this patent

Joska et al.: Chem. Abs., vol. 50, col. 5715 (1956).
Abstracted from Chem. Listy, vol. 49, pages 1687–92 (1955).